Sept. 18, 1928.

L. PARKER ET AL 1,684,845

ELECTRIC WATER HEATER FOR WATER COOLED INTERNAL COMBUSTION ENGINES

Filed March 3, 1925

WITNESS
H. Hurst

INVENTOR
L. E. Miller and
L. Parker
BY Denison & Thompson
ATTORNEYS

Patented Sept. 18, 1928.

1,684,845

UNITED STATES PATENT OFFICE.

LEROY PARKER, OF UTICA, AND LOU E. MILLER, OF NEW HARTFORD, NEW YORK.

ELECTRIC WATER HEATER FOR WATER-COOLED INTERNAL-COMBUSTION ENGINES.

Application filed March 3, 1925. Serial No. 12,915.

This invention relates to a fluid circulating system for internal combustion engines of the "water-cooled" type having the usual water jacket for the cylinders connected to any standard form of radiator in any well-known manner for keeping the temperature of the cylinders at a safe degree.

It is well-known that in the use of engines of this type in relatively low temperatures considerable difficulty is experienced in starting the engine after more or less prolonged periods of rest and in unheated garages and similar places of storage resulting in excessive discharge of the battery in operating the starting motor and consequent loss of the use of the car until the battery is re-charged.

Furthermore under these conditions even though greater or lesser amount of non-freezing cooling agent is employed in the colder climates there is always present the liability of freezing of the cooling liquid and consequent damage to the engine or radiator.

The main object of our present invention is to connect a relatively small and compact electric heater in the liquid circulating system in such manner that it may be easily and quickly connected to any ordinary incandescent lamp circuit with which the garage may be equipped and whereby the liquid in the circulating system may be kept at a reasonably warm temperature for indefinite periods of time while the car is housed.

Another object is to inclose the heating unit in such manner as to reduce the fire risk to a minimum.

Other objects and uses relating to specific parts of the device will be brought out in the following description.

In the drawings:

Figure 1 is a side elevation of an internal combustion engine for motor vehicles equipped with our improved liquid heating device.

Figure 1:
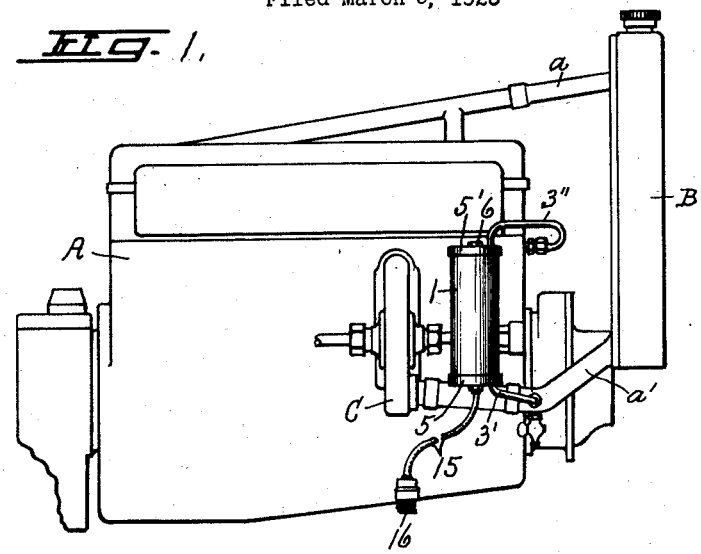
Figure 2:
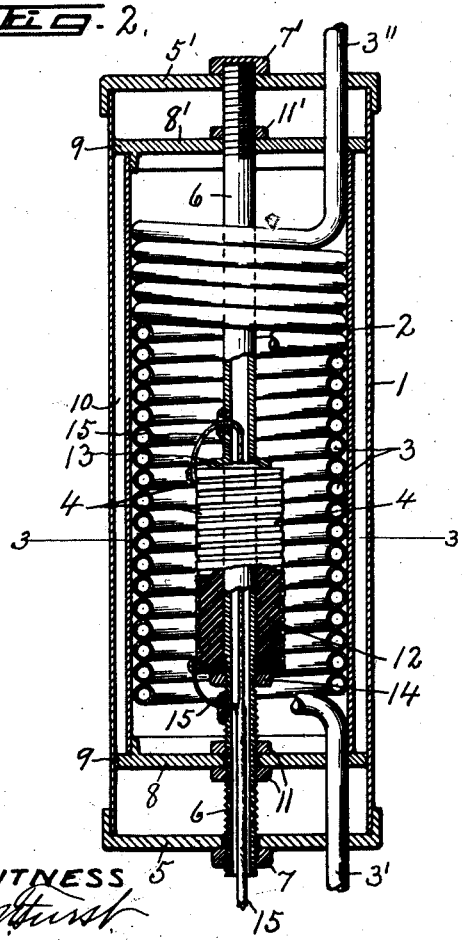
Figure 2 is an enlarged vertical sectional view of the detached heater.
Figure 3:
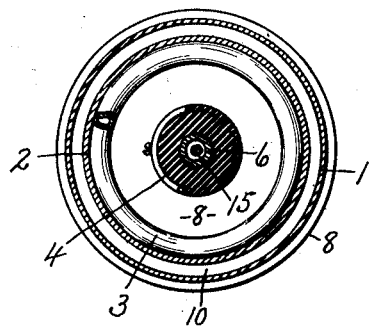
Figure 3 is a transverse sectional view taken in the plane of line 3—3, Figure 2.

In order that our invention may be clearly understood we have shown an internal combustion engine —A— of the water-cooled type having the usual water jacket connected by an upflow pipe —a— and a return flow pipe —a'— to a radiator —B— of any well-known construction, the water jacket of the engine being adapted to surround the cylinders in the usual manner.

As illustrated, the device for heating the water or other cooling agent in the circulating system comprises outer and inner cylindrical or tubular shells —1— and —2—, a pipe coil —3— and an electric heating unit —4—, the pipe coil and heating unit being inclosed within the protective housing consisting of the cylindrical shells —1— and —2—.

The outer shell —1— is somewhat longer than the inner shell —2— and extends beyond the opposite ends thereof and is provided with lower and upper end heads —5— and —5'— telescoping with the corresponding ends of the tube —1—.

A hollow tie bolt —6— extends entirely through and beyond the opposite ends of the outer case —1— co-axial therewith and also through central openings in the lower and upper end heads —5— and —5'— and has its opposite ends engaged by suitable nuts —7— and —7'— which also engage the outer faces of the end heads —5— and —5'— for clamping said heads to the corresponding ends of the outer tube, said nuts also serving to close the bolt openings in the adjacent heads to render the outer tube practically air and gas tight, the upper nut —7'— is preferably closed at the top to additionally protect the adjacent joint against entrance of moisture or gas, said nuts serving not only to facilitate the assembly of the various parts of the heater but also permits them to be readily taken apart when necessary for repairs or cleaning.

The inner tube —2— is of less diameter and relatively shorter than the outer tube —1— into which it is inserted and is provided with lower and upper end heads —8— and —8'— in vertically spaced relation for receiving the pipe coil —3— between them.

These heads —8— and —8'— are telescopically inserted in the corresponding ends of the tube —2— and are provided with annular flanges —9— of substantially the same diameter as the interior diameter of the tube —1— for holding the tube —2— in slightly spaced relation to the walls of the outer tube —1— and thereby to form an intervening air chamber —10— for heat-insulating purposes.

The hollow tie bolt —6— extends through central openings in the heads —8— and —8'— and are provided with additional nuts —11— and —11'— for engaging the corresponding end heads —8— and —8'— and thereby clamping them firmly against the corresponding ends of the inner tube —2— to form air and gas tight joints therewith and with the tie bolt —6—.

We preferably employ two of the nuts —11— for engaging the outer and inner faces of the lower head —8— thus permitting said head to be properly adjusted on the tie bolt before it is inserted in the outer tube and to otherwise facilitate the assembling of the various parts of the heater.

The pipe coil —3— is provided with a relatively large number of turns or convolutions coiled around the tie bolt —6— coaxial therewith and in spaced relation thereto so that the convolutions lie in close proximity to each other and extend the major portion of the length of the inner tube between the end heads —8— and —8'—, the outside diameter of the coil being substantially equal to the inside diameter of the inner tube —2— with just sufficient clearance to permit it to be moved endwise therein when assembling the various parts.

One end as —3'— of the pipe coil extends downwardly through suitable openings in the lower end heads —5— and —8— and is connected to the return flow conduit —a'— leading from the radiator —B— to an inlet of the suitable pump —C— having its outlet connected to the water jacket of the cylinders.

The upper end as —3"— of the pipe coil —3— extends through suitable openings in the tube heads —8'— and —5'— and is connected directly to the upper portion of the waterjacket of the engine thus completing the connection of the pipe coil in the water cooling system of the engine.

The electric heating element —4— consists of a band of electric resistance wire or tape wound around and upon a cylindrical support —12— of porcelain or other insulating material so that its convolutions are insulated from each other.

The insulating support —12— preferably consists of a tubular sleeve mounted upon the intermediate portion of the hollow tie rod —6— between the end heads —8— and —8'— of the inner tube —2— and also within the pipe coil so as to support the heating element —4— in spaced relation to the pipe coil and coaxial therewith.

This insulating sleeve —12— is clamped between shoulders —13— and —14— on the rod —6—, one of said shoulders as —14— being engaged with the threaded portion of the rod and, therefore, adjustable for permitting the removal of the sleeve from and upon the rod.

The opposite ends of the heating coil —4— are connected to a cable —15— which extends through the tubular tie rod —6— and outwardly therefrom and terminates in a suitable plug —16— adapted to be inserted in any suitable incandescent electric lamp socket in the building in which the car is housed.

The ends —3'— and —3"— of the pipe coil —3— are connected respectively to the conduit —a'— and to the water jacket of the engine by any suitable unions and when so connected establishes a supplemental circulating circuit from the water jacket and radiator through the pipe coil —3—.

When the plug —16— of the heating circuit is connected to the source of supply the heating coil —4— will be heated to impart its heat to the pipe coils —3— which are preferably made of copper thereby heating the water in said coils and causing it to circulate through the water jacket and radiator to keep the water therein at a sufficiently high temperature to facilitate the starting of the engine by the starting motor or by cranking if necessary and at the same time reducing the liability of freezing of the water in the circulating system.

What we claim is:

A device of the character described, comprising a double-walled shell having an air chamber between the walls thereof, a pipe coil within the shell and having its ends provided with means for attachment to the water circulating system of a water-cooled internal combustion engine, a hollow tie rod extending centrally through the shell and operatively connected to opposite ends thereof, an insulating support mounted on the tie rod and surrounded by the pipe coil and a heater coil, mounted on said support and having its ends extended into the tie rod and outwardly beyond one end thereof and provided with means for connection with a source of current supply.

In witness whereof we have hereunto set our hands this 24th day of February 1925.

LEROY PARKER.
LOU E. MILLER.